(12) United States Patent
Kawamura et al.

(10) Patent No.: US 7,149,011 B2
(45) Date of Patent: Dec. 12, 2006

(54) IMAGE READING APPARATUS AND IMAGE FORMING APPARATUS

(75) Inventors: Toshihiro Kawamura, Uji (JP); Katsushi Shoji, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 878 days.

(21) Appl. No.: 10/278,304

(22) Filed: Oct. 23, 2002

(65) Prior Publication Data

US 2003/0081262 A1 May 1, 2003

(30) Foreign Application Priority Data

Oct. 30, 2001 (JP) ............................. 2001-332879
Oct. 31, 2001 (JP) ............................. 2001-335548

(51) Int. Cl.
H04N 1/04 (2006.01)
H04N 1/32 (2006.01)
G03G 15/00 (2006.01)

(52) U.S. Cl. ...................... 358/496; 358/468; 358/474; 399/367

(58) Field of Classification Search ................ 358/496, 358/468, 474; 399/367; 271/264
See application file for complete search history.

(56) References Cited

U.S. PATENT DOCUMENTS 4,666,288 A 5/1987 Watanabe
4,687,317 A 8/1987 Appel et al.
4,720,729 A 1/1988 Watanabe
4,737,804 A 4/1988 Ayata et al.
4,967,235 A 10/1990 Sanbayashi
6,369,917 B1 * 4/2002 Sawada ...................... 358/468
2001/0040706 A1 * 11/2001 Kirita .......................... 358/474

FOREIGN PATENT DOCUMENTS

| JP | 54-42410 | 8/1952 |
| JP | 01-267252 | 10/1989 |
| JP | 3-7153 | 1/1991 |
| JP | 06-144671 | 5/1994 |
| JP | 07-117908 | 5/1995 |
| JP | 2002-145507 | 5/2002 |

OTHER PUBLICATIONS

British Search Report dated Jan. 22, 2003.

* cited by examiner

Primary Examiner—Twyler Lamb
Assistant Examiner—Houshang Safaipour
(74) Attorney, Agent, or Firm—Hogan & Hartson LLP

(57) ABSTRACT

An image forming apparatus includes a scanning unit that scans a document, a recording unit including a transfer unit that forms an image on a recording sheet, and a fuser unit that affixes a toner image on the recording sheet transferred by the transfer unit. A sheet discharging unit discharges the recording sheet and a recording sheet discharging tray stacks recording sheets discharged from the sheet discharging unit in a space formed above the scanning unit. The sheet discharging unit includes a guide member curving the recording sheet in a convex shape in a width direction.

10 Claims, 8 Drawing Sheets

IMAGE READING APPARATUS AND IMAGE FORMING APPARATUS

CROSS REFERENCES TO RELATED APPLICATIONS

This application claims priority under 35 USC 119 of Japanese Patent Application No. 2001-332879 and No. 2001-335548 filed in the Japanese Patent Office on Nov. 30, 2001 and Nov. 31, 2001, respectively, the entire disclosures of which are incorporated herein by reference.

BACKGROUND OF THE INVENTION

1. Field of the Invention

The present invention relates to an image forming apparatus, such as a facsimile machine, a copying machine, a scanner, a printer, or a composite machine thereof.

2. Description of the Related Art

An electrophotographic composite machine commonly includes a charge unit that charges the surface of a photoconductive drum evenly, an image writing unit that forms an electrostatic latent image by exposing light to the surface of the photoconductive drum based on an image data, a developer unit that develops an image by transferring toner to the electrostatic latent image, a transfer unit that transfers the toner image on a recording sheet that is carried along a recording sheet feed path, and a fuser unit that affixes the toner image on the recording sheet.

A series of processes is conducted, such as charging and exposing light to the photoconductive drum, developing, transferring the toner image to the sheet, and fusing. A recording sheet, which passes through a series of processes as described above, is placed on a sheet discharge tray after passing through the space in between a drive roller and a press roller including a sheet transportation unit.

First, an image recording apparatus includes a transfer unit that transfers a toner image to a recording sheet, a fuser unit that affixes the toner image on the recording sheet after the recording sheet passing through the transfer unit, a vertical feed path between the transfer unit and the fuser unit, a curved feed path between the fuser unit and a recording sheet outlet, and a recording sheet discharge tray that is formed on an upper surface of the apparatus. The recording sheet is arranged to be discharged upward at an angle from the recording sheet outlet for improving the ability of stacking the recording sheets.

Moreover, an image forming apparatus is known, which includes the recording sheet discharge tray in a space formed in between a reading part and a recording part for space saving. In the apparatus, the edge of the recording sheet may be curled when it touches the lower surface of the reading part that covers the upper surface of the recording part when the recording sheet is discharged.

Furthermore, in the widely-used image reading apparatus, a document supply tray is disposed on a document discharge tray and the trays are connected by a U-turn feed path, and an automatic document feeder (ADF) is provided for reading an image on a moving document at a read face that exists on the U-turn feed path by exposing light to the document. The document feed path is formed such that the recording sheet is curved and reversed in a smaller curvature radius than the one of the recording sheet feed path. Therefore, there is a possibility that the recording sheet is curled as the still warm sheet right after copying passes through the sheet feed path. Consequently, the recording sheet may also be curled parallel to the document feed direction in the image reading apparatus as well as the image recording apparatus as described above.

SUMMARY OF THE INVENTION

The present invention relates to an image forming apparatus, which improves the ability of stacking recording sheets.

A preferred embodiment of the present invention discloses the apparatus, wherein a press roller in a central part is provided in front of the one in the both ends part to the sheet feed direction and a guide plate is equipped so as to guide the curve, such that sheet materials are curved parallel to an orthogonal direction to a feed direction of recording sheets discharged from a pair of output rollers that transport the sheets to the tangent direction of a press roller and a feed roller.

Thus, the image recording apparatus of the present invention prevents the recording sheets from curling and piles up the discharged recording sheets on a recording sheet discharge tray in an orderly manner. Thus, the ability of stacking recording sheets is improved.

DETAILED DESCRIPTION OF THE INVENTION

Hereinafter, a preferred embodiment of the present invention that embodies a sheet transportation unit in a composite machine will be described with reference to drawings.

Figure 1A:
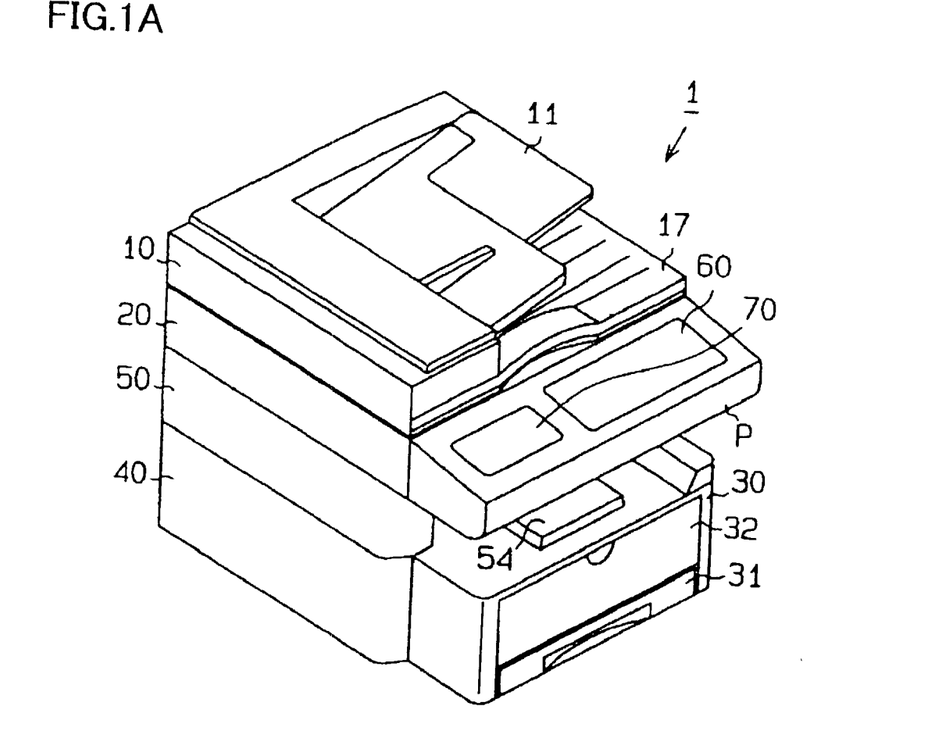
FIG. 1A is a perspective view of a composite machine in a preferred embodiment of the present invention.
Figure 1B:
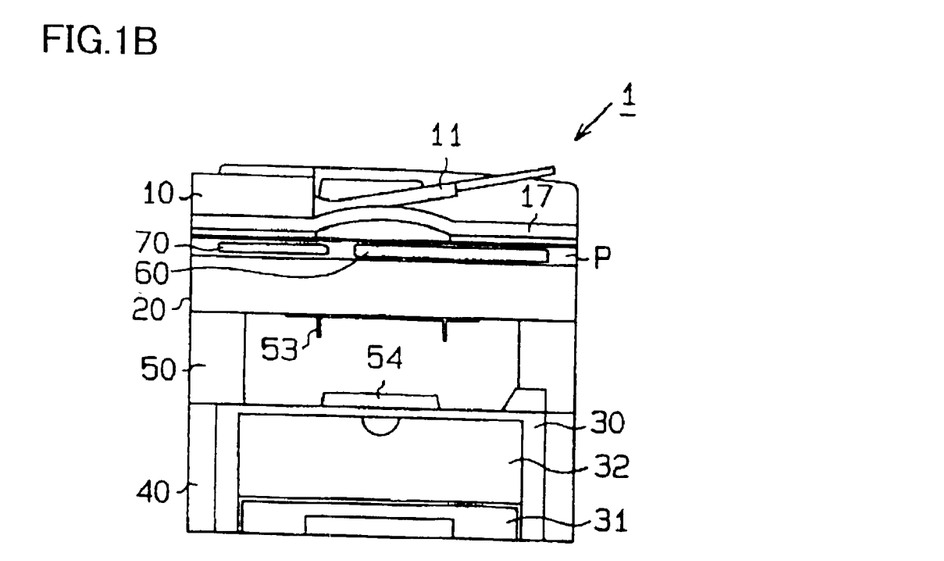
FIG. 1B is a front view of the composite machine.

Additionally, FIG. 1A is a perspective view of the composite machine, and FIG. 1B is a front view of the composite machine. Moreover, FIG. 2 is a front sectional view of an image reading unit, and FIG. 3 is a side sectional view of the image recording unit.

First, as illustrated in FIGS. 1A and 1B, a composite machine 1 includes an image reading unit 20 above an image recording unit 30. A recording sheet is discharged in between the reading unit and the recording unit. The image reading apparatus includes an Automatic Document Feeder 10 (hereinafter called "ADF") and a reading unit 20, and the image recording unit includes a recording sheet supply unit 30, an image forming unit 40, and a recording sheet discharge unit 50. Moreover, a scanning unit 60 and a display unit 70 are included in a panel P in front of the reading unit 20.

Figure 2:
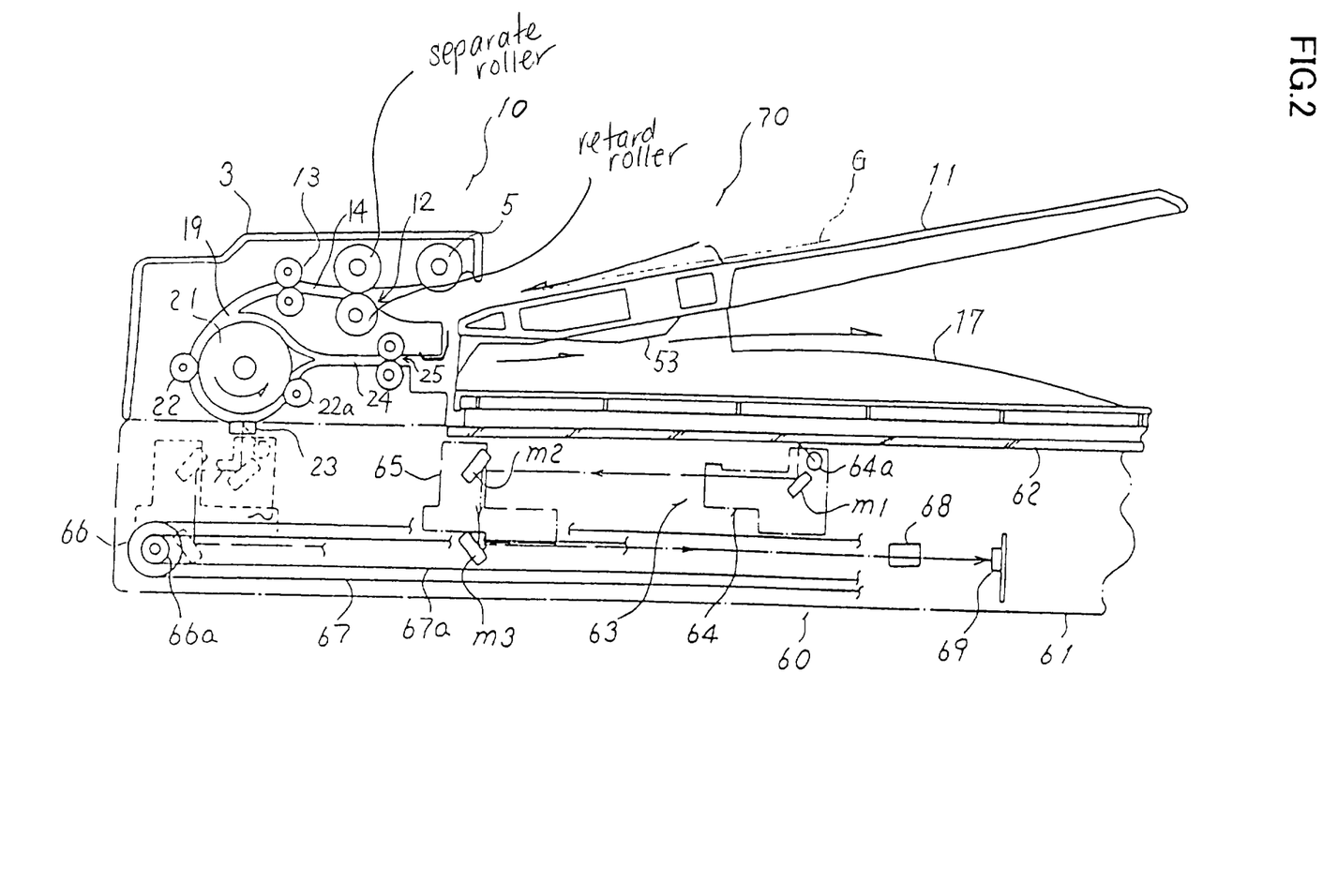
FIG. 2 is a front sectional view of a reading part in the composite machine.
Figure 3:
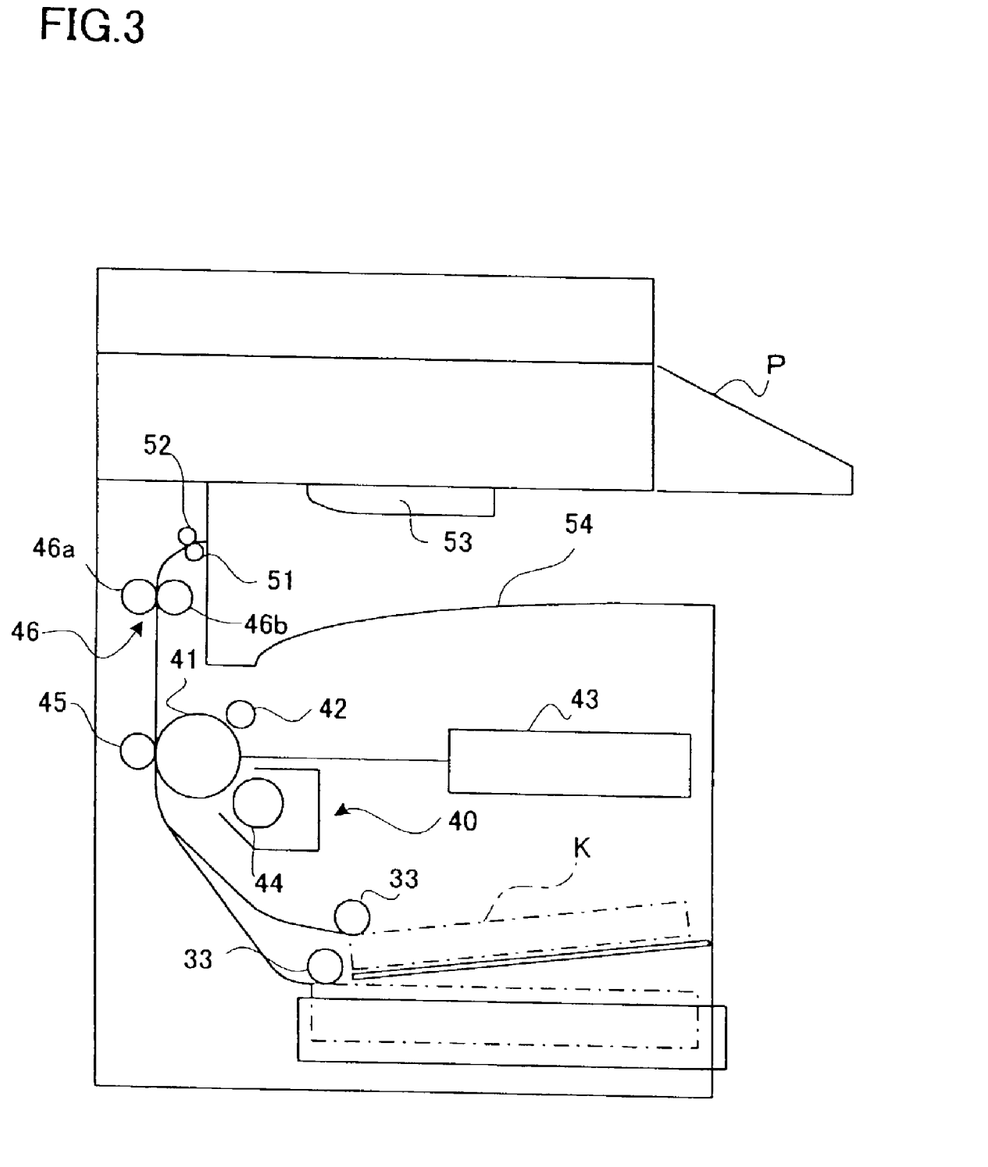
FIG. 3 is a side sectional view of a recording part in the composite machine.

Next, FIG. 2 shows an internal configuration of the reading unit 20 and a scanning device 63 is provided in a scanning frame 61 as illustrated in FIG. 2. The scanning device 63 also includes a full rate carriage 64 having a lump 64a and a mirror m1, and a half rate carriage 65 having two opposed mirror m2 and m3, as well as a conventional device used in the scanning device of the composite machine that is generally known. Light is exposed to the document, and the scanned information of the document is transmitted to a charge coupled device (CCD) 69 through a lens 68. Light signals are converted into electronic signals in the CCD 69, electronic signals are transmitted to the image processing unit of the image forming apparatus 3, and the image is printed on the recording sheet.

The scanning device 63 includes a drive pulley 66 and a drive pulley 66a concentrically whose diameter rate is set to be 2 to 1 in order to drive the full rate carriage 64 and the half rate carriage 65, and provides a mechanism that two carriages are moved relative to one another respectively through timing belts 67 and 67a that are wounded around the respective drive pulleys.

A flat glass surface 62 that is capable of accommodating a book type document and a moving document read surface 23 disposed in a lower part of the ADF 10 are disposed in the upper part of the frame 61. A scanner includes a flat glass surface 62 to hold pages of sheet, books and other objects for scanning. The scanning device 63 moves under the glass across the page. A user scans a document by lifting a flat bed cover 17, placing the document face down onto the glass surface 62, and then closing the flat bed cover 17. Then the user typically presses a start button in order to scan the document. The full rate carriage 64 of the scanning device 63 reciprocates only to the amount of the length of a sub scanning direction of the document to the document set on the flat glass surface 62, based on detection information of a sensor not shown in the drawings, and the half rate carriage 65 reads the image information with moving in a half speed of the full rate carriage 64.

The document set on a document tray 71 is scanned by the scanning part 60 by activating the control unit, based on the detection signal of the detection means not shown in the drawings, which detects that the document sheet is set on the document tray 71. After that, the full rate carriage 64 of the scanning device 63 moves to the position corresponding to the moving document read surface 23 and the half rate carriage 65 stops after moving to the position, based on the detection signal.

The ADF 10 picks up the document sheet with a pick up roller 5 that is disposed corresponding to a document supply tray 11 in a document sheet inlet for feeding the document sheet along a document sheet feed path, and the document sheet is transported to a feed path 14. After that, the document sheet is handled in between a separate roller and a retard roller of a document sheet handling device 12, and only the top document sheet is transported to a feed roller device 13. The document sheet that is fed out by the feed roller device 13 is transported to the moving document read surface 23 in the state of being nipped in between a large diameter drive roller 21 and a pinch roller 22 that are used as the feed roller device in the curvature path 19 of the document sheet feed path. When the document is transported on the read surface, the document is read. A guide film and a white platen 23a are disposed in the upper part of the moving document read surface 23, with the interval that the document sheet is capable of passing through, which are used as guides on the back surface side of the document sheet. The chatter of the document whose read surface is transported by the guide film 23b is prevented, and the scanning image is kept to be good.

The read document is transported out from a nip part of the large diameter drive roller 21 and a pinch roller 22a to the discharge tray 17 through a discharge path 24 by a discharge roller device 25 that is provided opposed to the drive roller 27 and the pinch roller 26.

Accordingly, the document sheet and the book document, etc. can be read by the flat glass surface 62 and the moving document read surface 23, and the read image data can be transmitted by using the transmit function of the facsimile machine and may also be printed on the recording sheet after transferring the read image to the image recording unit 30. Moreover, the ADF 10 may be used independently, or the ADF 10 and a flat bed scanner may be composed as one and used as the reading unit 20. More specifically, a guide plate 53 can be disposed in the configuration relation of a pair of the sheet feed roller 14 in the sheet discharge device that discharges the documents after being read, to be more precise, the ADF 10. In this case, as illustrated in FIG. 2, the guide plate 53 can be provided on the lower surface of the document supply tray 11. With the embodiment described above, the curl of the document can be corrected in a simple configuration.

As illustrated in FIGS. 1A and 1B, the recording sheet supply unit 30 is equipped with a recording sheet cassette 31 that stores a predetermined-size recording sheet K such as an A4 SEF size (width: 210 mm×length: 297 mm) in a laminated state, which is commonly used. Moreover, the recording sheet supply unit 30 is equipped with a manual tray 32 that places the recording sheet K whose size is based on users' request. As illustrated in FIG. 3, the recording sheet supply unit 30 includes a sheet feed roller 33 that picks up the recording sheets K one at a time from the top, which are placed in the recording sheet cassette 31 or the manual tray 32.

The recording unit 40 includes a photoconductive drum 41 that has a photoconductive film on a peripheral surface, a charge unit 42 that charges the photoconductive film of the photoconductive drum 41 to a predetermined potential evenly, an image writing device 43 (such as a laser scanner) that forms an electrostatic latent image on the photoconductive drum 41, and a developer unit 44 that develops an electrostatic latent image after the toner is supplied to the electrostatic latent image on the photoconductive drum 41. Moreover, the recording unit 40 includes a transferring unit 45 that transfers the toner image from the photoconductive drum 41 on to the recording sheet K and a fuser unit 46 that affixes the toner image on the recording sheet K as a permanent image. The fuser unit 46 includes a heat roller 46a that heats the image surface side of the recording sheet K on which the toner image is formed and a press roller 46*b* that applies pressure from the opposite side of the image surface side of the recording sheet K.

Figure 5:
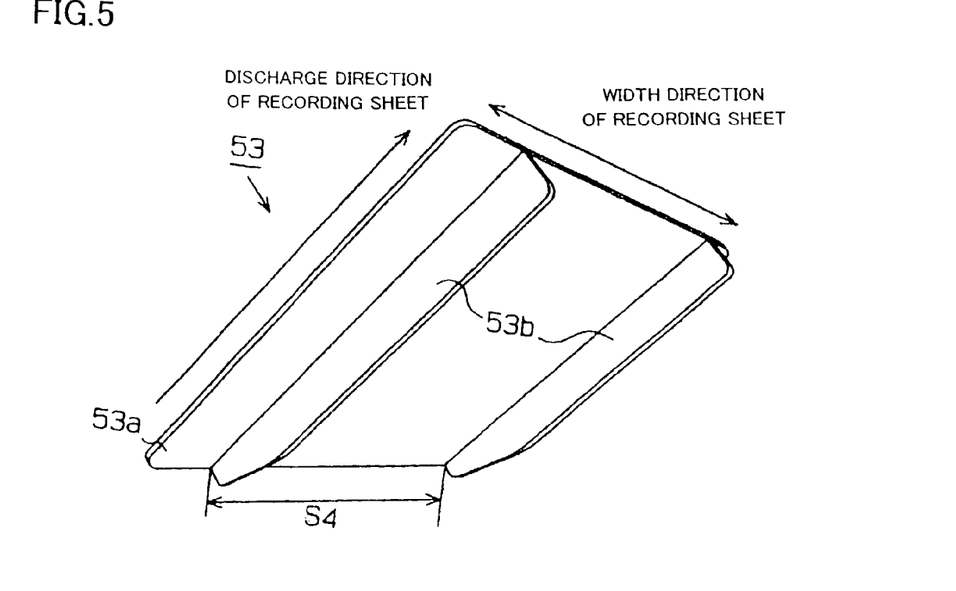
FIG. 5 is a perspective view of a guide plate.

Moreover, the recording sheet discharge unit 50 is equipped with a pair of the sheet discharge rollers including a sheet discharge roller 51 and a press roller 52, a guide plate 53 that curves the recording sheet in the width direction, which is discharged to the tangent direction of the sheet discharge roller 51 and the press roller 52, and a recording sheet discharge tray 54 that stacks the discharged recording sheet K. More precisely, as illustrated in FIG. 5, the guide plate 53 includes an attachment member 53*a* that is capable of attaching so as to remove on the lower surface of the reading unit 20, and a pair of the guide members 53*b* extending from the attachment member 53*a*. The respective guide members 53*b* are parallel to each other and are provided parallel to the discharge direction of the recording sheet K. The recording sheet K, which is discharged upward at an angle from the space between the sheet discharge roller 51 and the press roller 52 to the guide plate 53, is controlled such that the both ends parts of the sheet are not going upward in an axial direction by the respective guide members 53*b*. With a composite machine 1 where A4 SEF size recording sheet K is used, it is preferable that an interval S4 of both guide members 53*b* is made to be about 140 mm.

Figure 4A:
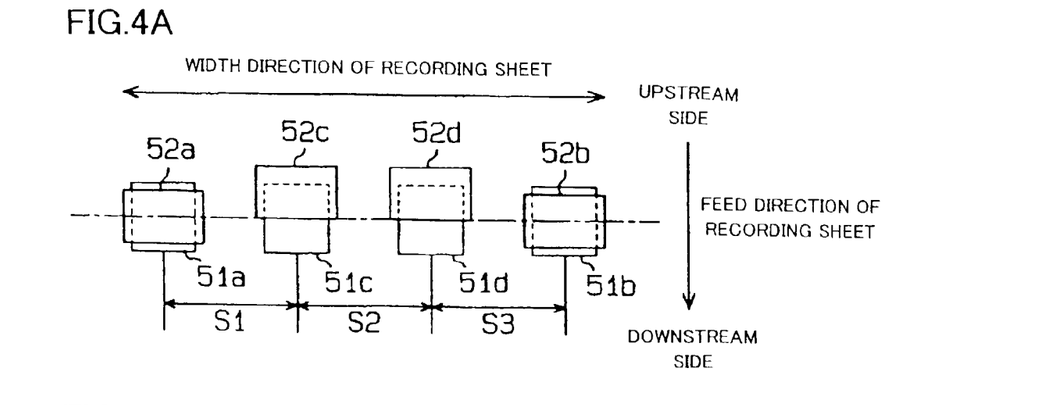
FIG. 4A is a schematic plane view showing a configuration relation between a sheet feed roller and a press roller.

Next, the characteristic configuration of the recording sheet discharge unit 50 will be described. FIG. 4A is a schematic plane view showing the relationship between the sheet discharge roller 51 and the press roller 52, FIG. 4B is a schematic side view showing the relationship between the discharge roller 51 and the press roller 52, and FIG. 5 is a perspective view of the guide plate 53.

As illustrated in FIG. 4A, the sheet discharge roller 51 and the press roller 52 are respectively provided by four in parallel to a width direction of the recording sheet K orthogonal to the feed direction of the recording sheet K. Hereinafter, as a matter of convenience, codes 51*a* and 51*b* are added to the sheet discharge roller 51 that is located at both ends parts of the recording sheet K in the width direction, and codes 52*a* and 52*b* are added to the press roller 52 at both ends parts that are opposed to the discharge rollers 51*a* and 51*b*. Moreover, codes 51*c* and 51*d* are added to the two sheet discharge rollers 51 that are located in the central part of the recording sheet K at the width direction, and codes 52*c* and 52*d* are added to the press rollers 52 in the central part, which are opposed to the discharge rollers 51*c* and 51*d*.

Figure 4B:
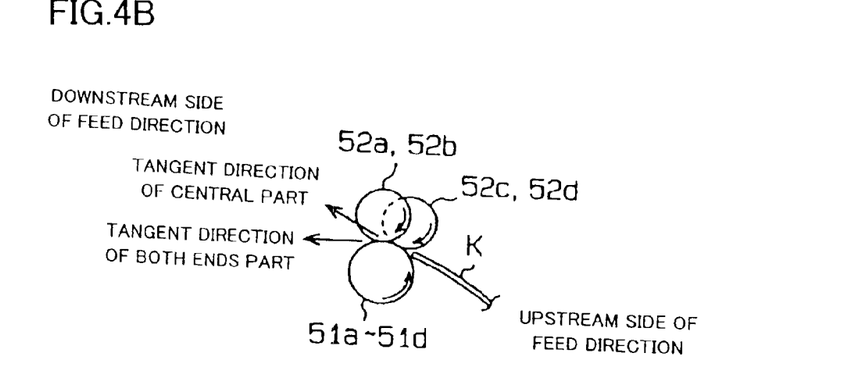
FIG. 4B is a schematic side view showing a configuration relation between the sheet feed roller and the press roller.

As illustrated in FIGS. 4A and 4B, the discharge rollers 51*a*~51*d* are provided on the same axis line in parallel with the width direction of the recording sheet K. Moreover, the press rollers 52*a* and 52*b* located at both ends part of the recording sheet K in the axis direction are provided on the sheet discharge rollers 51*a* and 51*b*. Furthermore, the press rollers 52*c* and 52*d* that are located in the central part of the recording sheet K in the axis direction are provided on the upper stream side of the recording sheet K in the feed direction than the press rollers 52*a* and 52*b* on the upper side of the sheet discharge rollers 51*c* and 51*d*. After that, the recording sheet K is discharged in a tangent direction of the sheet discharge roller 51 that is rotated clockwise by the motor in the drawings and the press roller 52 that is driven by the rotation of the discharge roller 51.

The direction of discharging the recording sheet K is horizontal to both ends part of the recording sheet K in the width direction, and is upward at an angle in the central part of the recording sheet K in the width direction. In other words, it is the tangent direction that the recording sheet K is discharged accompanied by the rotations of the sheet discharge roller 51 and the press roller 52 (the tangent direction from the upper stream side to the downstream side in the feed direction of the recording sheet K). Therefore, the recording sheet K that is transported to the space between the discharge roller 51 (51*a*~51*d*) and the press roller 52 (52*a*~52*d*) is discharged to the tangent direction of both rollers 51 and 52 curved in the width direction, to be more precise, where the central part to the width direction is located upper than both ends part in the width direction.

Here, the recording sheet K that is transported to the space in between the discharge roller 51 (51*a*~51*d*) and the press roller 52 (52*a*~52*d*) is discharged on a center basis in the width direction. Thus, in case the composite machine 1 uses the A4 SEF size recording sheet K (width: 210 mm×length: 297 mm), a letter size recording sheet K (width: 8.5 inch× length: 11 inch), and a legal size recording sheet K (width: 8.5 inch×length: 14 inch) it is preferable that the interval S1~S3 of two adjacent press rollers 52 (the discharge roller 51) is made to be about 70 mm, parallel to the width direction of the recording sheet K.

As illustrated in FIG. 5, the guide plate 53 includes the attaching unit 53*a* that is attached on the lower surface of the reading unit 20 so as to be removed and a pair of guide members 53*b* that is formed vertically to the attachment members 53*a*. The respective guide members 53*b* are provided parallel to the discharge direction of the recording sheet K, and they are also parallel to each other. Here, the central part of the recording sheet K in the width direction is discharged upward at an angle from the space in between the sheet discharge roller 51 and the press roller 52, and both end parts of the recording sheet K in the width direction is discharged almost horizontally, so that the shape of the recording sheet K that is discharged in the convex state in the width direction is maintained by the guide plate 53. Therefore, it is preferable to include the apparatus such that the respective guide members 53 become to the space in between the press roller 52*a* and the press roller 52*c* and the space between the press roller 52*d* and the press roller 52*b* for maintaining the shape of the recording sheet K by the guide plate 53. To be more precise, when the composite machine 1 use the A4 SEF recording sheet K (width: 210 mm×length: 297 mm) it is preferable to design the apparatus such that an interval S4 of both guide members 53*b* is made to be about 140 mm. Moreover, the guide plate 53 whose intervals of the guide plates are different is respectively provided, and is exchanged based on the size of the recording sheet used by users.

Figure 6A:
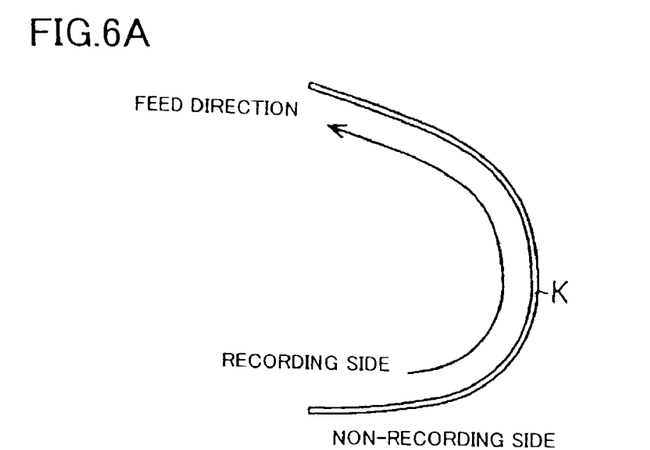
FIG. 6A is a side view showing the shape of a recording sheet that is curled to a sheet feed direction.

Next, the operation, in case that the composite machine 1 records an image on the recording sheet K in the recording sheet cassette 31 and the recording sheet K placed in the multi purpose tray and the recording sheet K is discharged from the sheet discharge tray 54, will be described with reference to FIG. 6A~6C, and referencing FIG. 2 and FIG. 3.

When a read image data of a document G is printed on the recording sheet K, or when the received image data is printed on the recording sheet K, after scanning the document G, which is transported from the document supply tray 71 and is placed on the moving document read surface 23 or a document flat glass surface 62 by the scanning device 63, one recording sheet K is separated by the sheet feed roller 33 and a friction pad (not shown in the drawings). When the separated recording sheet K comes to the space between the photoconductive drum 41 and the transfer unit 45, the toner image that is formed on the photoconductive drum by a bias voltage that is applied to the transfer unit is transferred to the recording sheet K. After that, when the recording sheet K comes to the space between a heat roller 46a and a press roller 46b, the recording sheet K that supports the toner image is heated to be pressed, and the toner image is affixed on the recording sheet K as a permanent image. Then, only the recording side of the recording sheet K is heated, so that for example, the recording sheet K is curled by making the recording side inside, for reasons that the amount of water evaporation on the recording surface side and the non-recording surface side in the recording sheet K are different, and the heat shrinkage rates of the recording sheet K and the toner are different, etc. The curled recording sheet K is curled more parallel to the feed direction by making the recording side of the recording sheet that the toner image is affixed, when passing through the feed path that is curved reversely (see FIG. 6A).

Figure 6B:
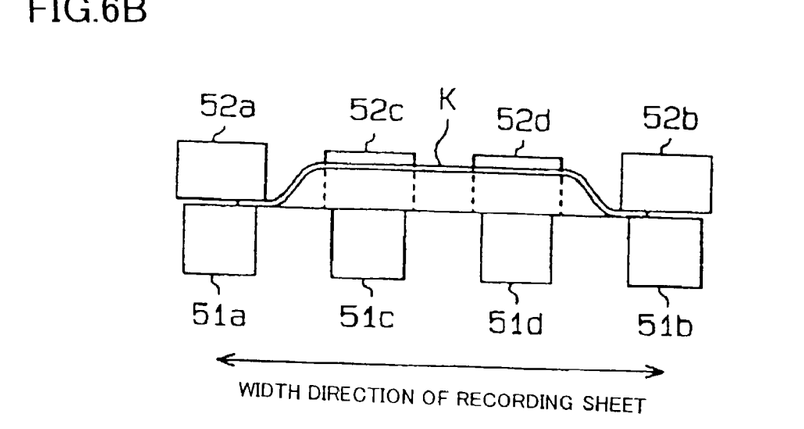
FIG. 6B is a front view showing the shape of the recording sheet that is curled to a width direction.
Figure 6C:
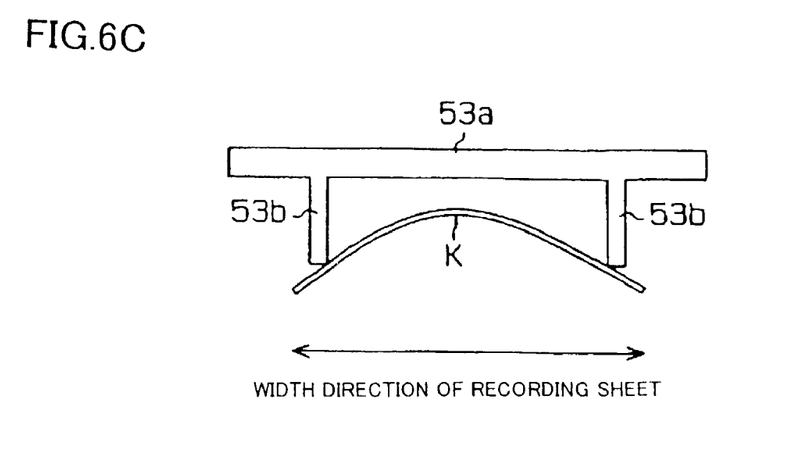
FIG. 6C is a front view showing the shape of the recording sheet that is supported by the guide plate.

When the recording sheet K that is curled to the feed direction comes to the space between the sheet discharge roller 51 and the press roller 52, the recording sheet K is discharged to a tangent direction of both rollers 51 and 52 in the state of curving to the width direction, to be more precise, in a convex shape upward (see FIG. 6B). After that, the recording sheet K is discharged upward at an angle from the space between the sheet discharge roller 51 and the press roller 52 to the guide plate 53 in the convex shape upward. Later on, the recording sheet K that comes to the guide plate 53 is contacted with both guide members 53b, and is maintained in the convex shape upward (see FIG. 6C). Consequently, when the end of the recording sheet K is discharged from the space between the sheet discharge roller 51 and the press roller 52, the recording sheet K is piled on the sheet discharge tray 54 in a good condition with correcting the curl parallel to the feed direction as the recording sheet K is curled in the width direction as described above.

According to the preferred embodiment of the present invention, as described above, the following effect may be acquired.

(1) The discharge rollers 51a~51d are provided on the same axis line parallel in the width direction of the recording sheet K, and the press rollers 52c and 52d that are located in the central part of the recording sheet K in the width direction are provided on the upper stream side in the feed direction of the recording sheet K than the press rollers 52a and 52b that are located on both end parts of the recording sheet K in the width direction. In other words, the tangent directions of the sheet discharge roller 51 and the press roller 52 in the central part of the recording sheet K in the width direction and on both ends part of the recording sheet K in the width direction are different. Therefore, the recording sheet K that is carried between the discharge roller 51 (51a~51d) and the press roller 52 (52a~52d) is discharged to different tangent directions in the central part in the width direction and in both ends part in the width direction. More specifically, the recording sheet K is discharged in the tangent direction of the sheet discharge roller 51 and the press roller 52 in the convex shape upward.

(2) The recording sheet K is not piled on the sheet discharge tray 54 in a curled state in the feed direction by correcting the curl of the recording sheet K. More specifically, the curl is corrected when the recording sheet K is curled in the feed direction along with fixing and passing it through the feed path, curled to the width direction, based on the relationship of the discharge roller 51 and the press roller 52. Therefore, the recording sheet K can be piled on the discharge tray 54 in a flat manner. Accordingly, the recording sheet is not dropped from the recording sheet discharge tray by pushing out the recording sheets from the recording sheet discharge tray.

(3) The apparatus is constructed such that the curl of the recording sheet K is corrected parallel in the feed direction only by changing the relationship between the discharge roller 51 and the press roller 52. Thus, the space above the discharge tray 54, in other words, the space between the reading unit 20 and the recording sheet supply unit 30 can be made narrower as the apparatus is capable of piling many recording sheets K even when the recording sheet K is curled to the feed direction. Moreover, there is no need to provide an S-shaped feed path for eliminating the curl in the recording sheet K. Consequently, the composite machine 1 can be made simpler, so that the height of the composite machine 1 can be lower by correcting the curl in the recording sheet K in the feed direction.

(4) The tangent direction of the sheet discharge roller 51 and the press roller 52, which the recording sheet K is discharged, is in the upward direction at an angle in the central part of the recording sheet K in the width direction, and the horizontal direction of both ends parts of the recording sheet K in the width direction. More specifically, the recording sheet K is discharged curved in the width direction, to be more precise, in a convex shape with the central part in the width direction located at an upper position than both ends part in the width direction. The recording sheet K that is discharged from the space between the sheet discharge roller 51 and the press roller 52 curved in the width direction is maintained by both guide members 53b of the guide plate 53 in the convex state with the central part in the width direction located at an upper position than both end parts in the width direction. Thus, even when the recording sheet K is curled parallel to the feed direction, the curl can be corrected.

(5) The recording sheet K that is discharged from the space between the discharge roller 51 and the press roller 52 is contracted only with both guide members 53b of the guide plate 53 before discharging to the sheet discharge tray 54. Thus, compared with the conventional configuration that is not equipped with the guide plate 53, the friction that exists between the recording sheet K and the guide plate 53 becomes smaller as the area contacting the recording sheet K is quite narrow. Therefore, the friction does not increase the curl, the piling condition of the recording sheet K on the sheet discharge tray 54 is good, and many recording sheet K can be piled on the sheet discharge tray 54.

Additionally, the preferred embodiment of the present invention can be changed as follows.

The apparatus can be constructed such that the press rollers 52a and 52b that are located at both end parts of the recording sheet K in the width direction is omitted. When the apparatus is constructed as described above, as the tangent direction of the sheet discharge roller 51 and the press roller 52 is in the upward direction at an angle in the central part of the recording sheet K in the width direction, the central part of the recording sheet K in the width direction is discharged parallel to the upward direction at an angle when the recording sheet K is discharged between the discharge roller 51 and the press roller 52. On the other hand, as the press rollers 52a and 52b are not provided on both end parts of the recording sheet K in the width direction, both end parts of the recording sheet K in the width direction hang down by their own weight when the recording sheet K is discharged between the discharge roller 51 and the press roller 52. In other words, the recording sheet K is discharged between the discharge roller 51 and the press roller 52, in a convex state with the central part in the width direction located above both end parts in the width direction.

Figure 7A:
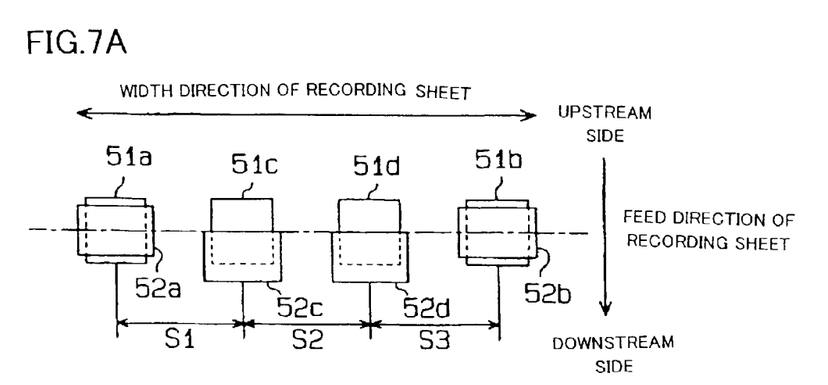
FIG. 7A is a schematic plane view showing the configuration relation between the sheet feed roller and the press roller in the other embodiment of the present invention.
Figure 7B:
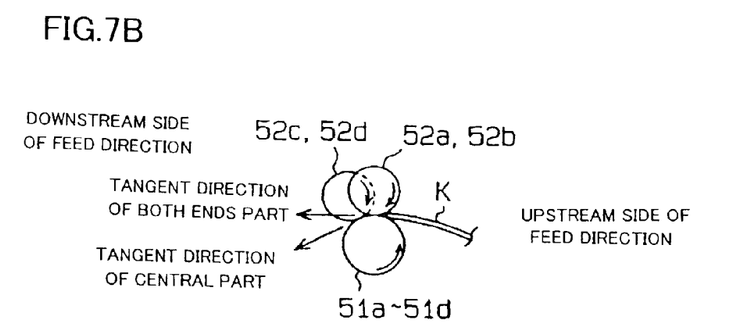
FIG. 7B is a schematic side view showing the configuration relation between the sheet feed roller and the press roller in the other embodiment of the present invention.
Figure 8:
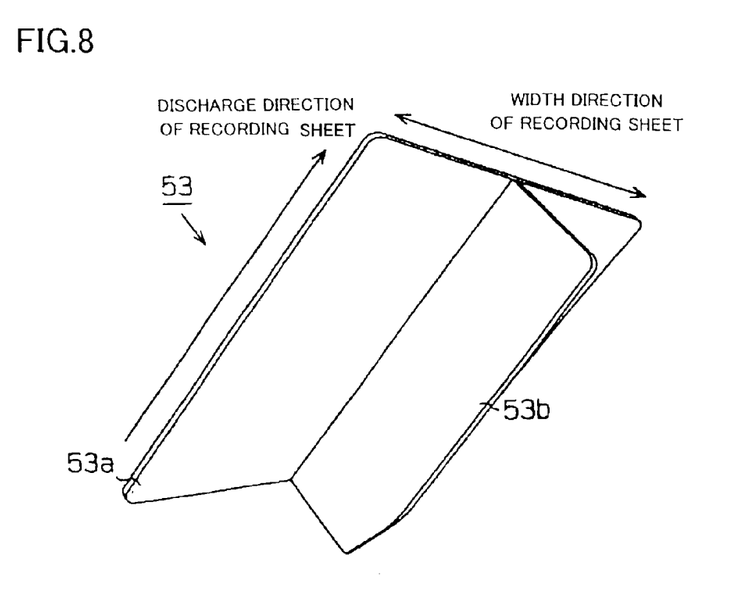
FIG. 8 is a perspective view of the guide plate in the other embodiment of the present invention.

As illustrated in FIGS. 7A and 7B, the apparatus may be also constructed such that the press rollers 52c and 52d are located in the central part of the recording sheet K in the width direction provided on a lower stream side of the recording sheet K in the feed direction than the press rollers 52a and 52b that are located on both end parts of the recording sheet K in the width direction. As illustrated in FIG. 8, the apparatus may also be constructed such that the guide members 53b of the guide plate 53 are provided only in the central part of the recording sheet K in the width direction. When the apparatus is constructed as described above, the tangent direction of the discharge roller 51 and the press roller 52 is horizontal to both end parts of the recording sheet K in the width direction, or is lower in direction at an angle in the central part of the recording sheet K in the width direction. More specifically, the recording sheet K is discharged in a convex state with the central part in the width direction located under both end parts in the width direction.

The recording sheet K, discharged between the sheet discharge roller 51 and the press roller 52 in a curved state in the width direction, is maintained by the guide members 53b of the guide plate 53 convex downward, which the central part in the width direction lower than both end parts in the width direction. Additionally, the apparatus can be constructed such that the upper surface of the sheet discharge tray 54 is curved in the width direction of the recording sheet K in order to pile the recording sheet K that is curved in the width direction in a convex shape downward on the sheet discharge tray 54 keeping the curved shape.

The apparatus may be constructed such that the press rollers 52c and 52d that are located in the central part of the recording sheet K in the width direction are provided on the upper stream side in the feed direction of the recording sheet K right above the sheet discharge rollers 51c and 51d, and the press rollers 52a and 52b are located on both end parts of the recording sheet K in the width direction are provided on the lower side in the feed direction of the recording sheet K right above the discharge rollers 51a and 51b. When the apparatus is constructed as described above, the tangent direction of the discharge roller 51 and the press roller 52 is in an upper direction at an angle in the central part of the recording sheet K in the width direction, and is in a lower direction at an angle on both end parts of the recording sheet in the width direction. As the recording sheet K is curved and discharged in the width direction in a convex upward shape, the curl of the recording sheet K, which is parallel to the feed direction, may be corrected.

The apparatus can be constructed such that the press rollers 52c and 52d located in the central part of the recoding sheet K in the width direction is provided on the lower stream side of the recording sheet K in the feed direction right above the discharge rollers 51c and 51d, and the press rollers 52a and 52b that are located on both end parts of the recording sheet K in the width direction are provided on the upper stream side of the recording sheet K in the feed direction right above the discharge rollers 51a and 51b. When the apparatus is constructed as described above, the tangent direction of the discharge roller 51 and the press roller 52 is in the downward direction at an angle in the central part of the recording sheet K in the width direction, and is in the upward direction at an angle on both end parts of the recording sheet K in the width direction. Thus, as the recording sheet K is curved and discharged in the width direction in a convex downward shape, the curl of the recording sheet K, which is parallel to the feed direction, can be corrected.

Consequently, the curl parallel to the feed direction of the recording sheet K can be corrected. Furthermore, the curl parallel to the feed direction of the recording sheet K can be corrected by the synergy of the curl correction parallel in the feed direction of the recording sheet K and the curl correction maintenance by the guide plate 53 based on the relationship of the discharge roller 51 and the press roller 52.

The apparatus can be constructed such that the configuration relation of the discharge roller 51 and the press roller 52 is upside down. In other words, in the configuration that the sheet discharge rollers 51a~51d are provided on the same axis line parallel to the width direction of the recording sheet K, the apparatus can be constructed such that the press rollers 52a and 52b that are located on both end parts of the recording sheet K in the width direction and the press rollers 52c and 52d that are located in the central part of the recording sheet K in the width direction are provided on different axis lines parallel to the width direction of the recording sheet K.

The apparatus can be constructed such that the sheet discharge rollers 51a and 51b located on both end parts of the recording sheet K in the width direction and the discharge rollers 51c and 51 located in the central part of the recording sheet K in the width direction are provided on different axis lines parallel to the width direction of the recording sheet K. In this case, the press rollers 52a~52d are disposed opposite to the sheet discharge rollers 51a~51d such that the tangent directions of the sheet discharge roller 51 and the press roller 52 differ on both end parts of the recording sheet K in the width direction and in the central part of the recording sheet K in the width direction.

Figure 9A:
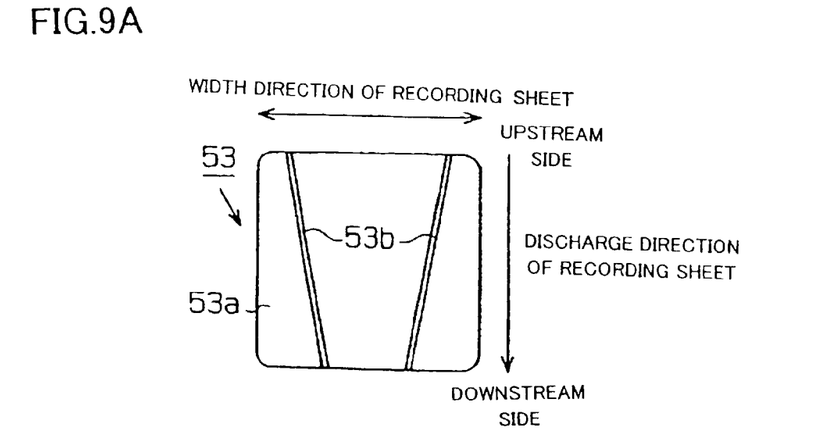
FIGS. 9A, 9B, and 9C are bottom plan views of the guide plates in the other embodiment of the present invention.
Figure 9B:
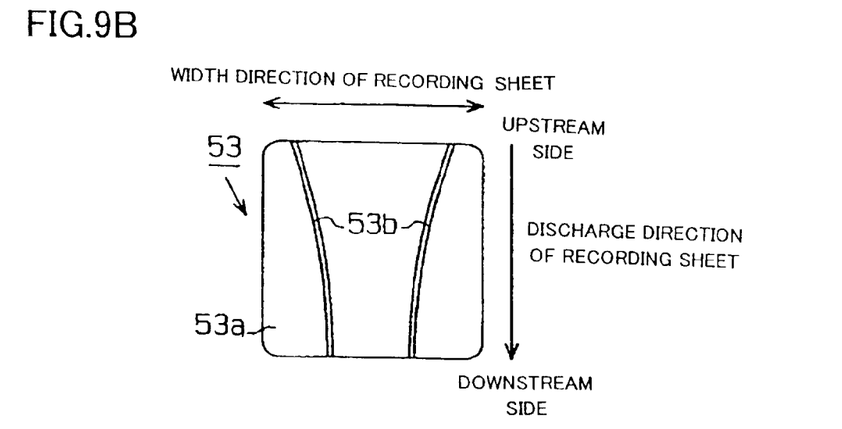
Figure 9C:
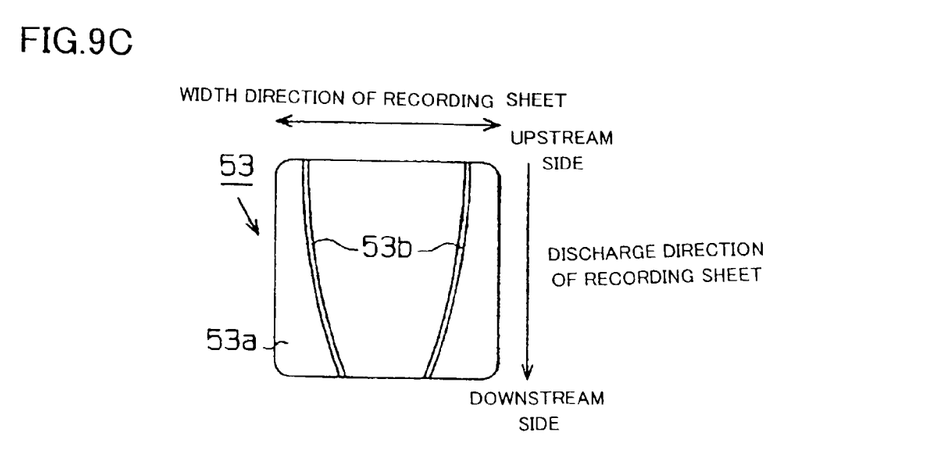

The apparatus can be constructed such that the distance between a pair of the guide members 53b becomes shorter as the discharge direction of the recording sheet K goes from the upper stream side to the lower stream side. To be more precise, as illustrated in FIG. 9A, the apparatus can be constructed such that the distance between a pair of the guide members 53b can be shorten in the linear direction as the discharge direction of the recording sheet K goes from the upper stream side to the lower stream side. In other words, as illustrated in FIGS. 9B and 9C, the apparatus can be constructed such that the distance between a pair of the guide members 53b becomes shorten roundly as the discharge direction of the recording sheet K goes from the upper stream side to the lower stream side. When the apparatus is constructed as described above, the upward movement on both end parts of the recording sheet K in the width direction that is discharged in the tangent direction of the discharge roller 51 and the press roller 52 is controlled by a pair of the guide members 53b, and the sheet is curved upward in the width direction in a convex shape. As the recording sheet K goes from the upper stream side to the lower stream side to the discharge direction, the upward movement of the sheet in the direction of the central part to the width direction is controlled. More specifically, the recording sheet K is curved to the width direction in the convex shape, having a large difference between the central part of the width direction and the both ends part to the width direction as the discharge direction goes from the upper stream side to the lower stream side. In other words, the width direction of the recording sheet K is curved in a small curvature radius, as the discharge direction goes from the upper stream side to the lower stream side. Accordingly, the curl to the feed direction of the recording sheet can be surely corrected.

Figure 10A:
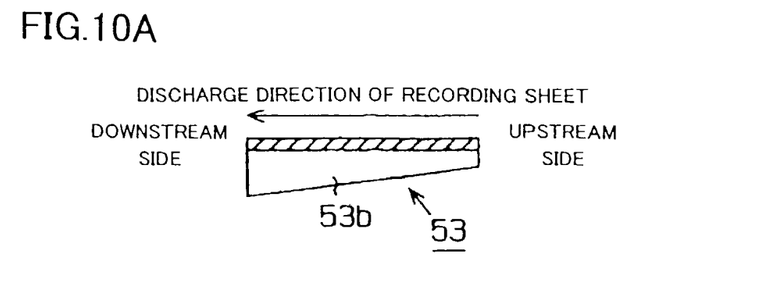
FIGS. 10A, 10B, and 10C are side sectional views of the guide plates in the other embodiment of the present invention.
Figure 10B:
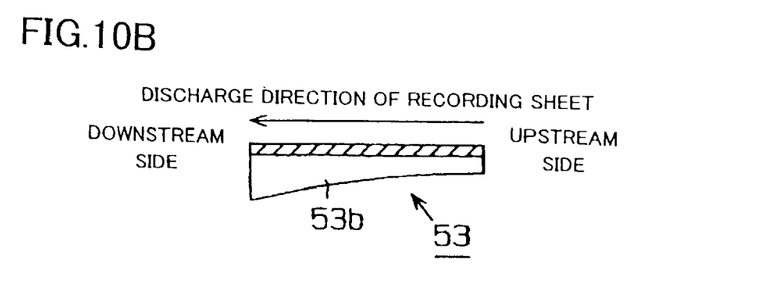
Figure 10C:
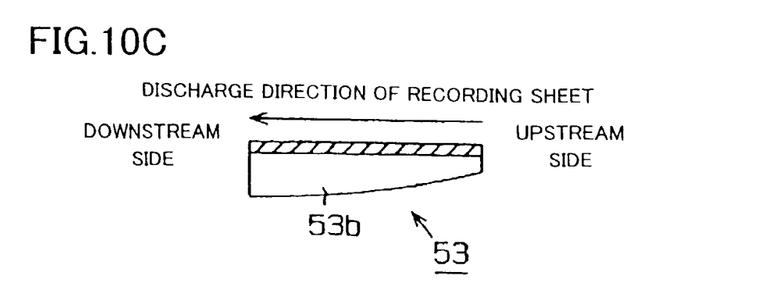

The apparatus can be constructed such that a hanging amount of a pair of guide members 53b becomes longer as the discharge direction of the recording sheet K goes from the upper stream side to the lower stream side. To be more precise, as illustrated in FIG. 10A, the apparatus can be constructed such that a hanging amount of a pair of guide members 53b becomes longer in the linear direction as the discharging direction of the recording sheet K goes from the upper stream side to the lower stream side. Or, as illustrated in FIGS. 10B and 10C, the apparatus can be constructed such that the hanging amount of a pair of guide members 53b becomes longer roundly as the discharge direction of the recording sheet K goes from the upper stream side to the lower stream side. When the apparatus is constructed as described above, the upward movement on both end parts of the recording sheet K in the width direction that is discharged in the tangent direction of the discharge roller 51 and the press roller 52 is controlled by a pair of guide members 53b, and the sheet is curved in the width direction in a convex shape. This, the upward movement on both end parts of the recording sheet K in the axis direction is controlled in the lower position as the discharge direction goes from the upper stream side to the lower stream side. In other words, the recording sheet K is curved in the width direction in the convex shape, having a large difference between the central part in the width direction and both end parts in the width direction as the discharge direction goes from the upper stream side to the lower stream side. In other words, the width direction of the recording sheet K is curved in a small curvature radius as the discharge direction goes from the upper side to the lower side. Accordingly, the curl of the recording sheet K in the feed direction is corrected.

Figure 11:
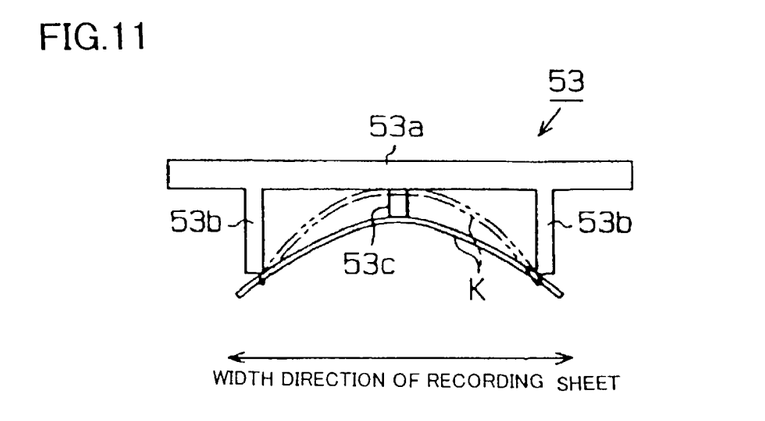
FIG. 11 is a front view showing the shape of the recording sheet that is curved to the width direction by the guide plate in the other embodiment of the present invention.

As illustrated in FIG. 11, the apparatus can be constructed such that the guide plate 53c that is shorter than the hanging amount of the guide members 53b is extended between a pair of the guide members 53b parallel to the discharge direction of the recording sheet K. When the apparatus is constructed as described above, when the recording sheet K is discharged energetically in the tangent direction of the discharge roller 51 and the press roller 52, the upward movement is controller by the guide plate 53c in the central part of the recording sheet K in the width direction, and the recording sheet K can be discharged smoothly with the transporting power by the discharge roller and the guide plate with curving in the width direction. Moreover, compared with the case not providing the guide plate 53c (see the chain doubled-dash line in FIG. 11), the area contacting the recording sheet K becomes narrower, and the friction that acts between the recording sheet K and the guide parts 53 becomes smaller.

As illustrated in FIG. 1B, the composite machine 1 in the preferred embodiment of the present invention is constructed such that the space between the reading unit 20 and the recording unit 40, in other words, the space on the sheet discharge tray 54 is relatively narrow. Thus, the position of contacting the recording sheet K that is discharged in the tangent direction of the discharge roller 51 and the press roller 52 is the lower surface of the reading unit 20 or the lower surface of the table made of the plate that supports the reading unit. Therefore, the recording sheet K that is discharged in the tangent direction of both rollers 51 and 52 can be curved in the width direction in the guide plate 53 that is provided on the lower surface of the reading unit 20.

Contrary to the above configuration, in the case of the composite machine 1 that is constructed such that the space between the reading unit 20 and the recording unit 40 is wide, a pair of the control members (a curve application means) is arranged to hang in a position (the space) for contacting both end parts of the recording sheet in the width direction that is discharged in the tangent direction of both rollers 51 and 52, and the apparatus can be constructed such that a pair of the control members is energized downward by an energization device such as a helical torsion spring. When the apparatus is constructed as described above, as a pair of the control members functions as well as a pair of the guide members 53b in the preferred embodiment of the present invention, the recording sheet K can be curved in the width direction. Additionally, the downward energization power of the pair of control members by the energization device is needed to be larger than the upthrust power of a pair of the control members by the discharging power of the recording sheet K.

After the image is recorded on the recording sheet K, after being read by image forming apparatus such as a printer that discharges the recording sheet K and the image on a document G, the preferred embodiment of the present invention can be applied to the image reading apparatus such as a scanner that discharges the document G after reading.

Though the apparatus is constructed such that the recording sheet is discharged from the back side of the apparatus to the discharge tray, the image forming apparatus can be constructed such that the recording sheet is discharged from the side of the apparatus to the recording sheet discharge tray. Therefore, users can be access to the recording sheet from the two directions (the side of the apparatus and the front of the apparatus), and the recording sheet can be easily picked up.

What is claimed is:

1. An image forming apparatus comprising:
   a scanning unit that scans a document;
   a recording unit including a transfer unit that forms an image on a recording sheet;
   a fuser unit that affixes a toner image on the recording sheet transferred by the transfer unit;
   a sheet discharging unit that discharges the recording sheet; and
   a recording sheet discharging tray that stacks recording sheets discharged from the sheet discharging unit in a space formed above the recording unit, wherein the sheet discharging unit includes a guide member curving the recording sheet in a convex shape in a width direction,
   wherein the guide member includes an attachment member and a stand installation member parallel to the discharging direction for making the recording sheet convex in the width direction by contacting the recording sheet discharged upward at an angle from the sheet discharging unit.

2. The image forming apparatus as in claim 1, wherein the attachment member is detachable.

3. The image forming apparatus as in claim 1, wherein the guide member controls an interval of guide pieces so as to curve the recording sheet in a smaller curvature radius as the recording sheet goes from an upstream direction to a downstream direction.

4. The image forming apparatus as in claim 3, wherein, a distance between a pair of the guide pieces is shortened as the recording sheet goes from the upstream direction to the downstream direction.

5. The image forming apparatus as in claim 3, wherein, a distance between a pair of guide pieces is lengthened as the recording sheet goes from the upstream direction to the downstream direction.

6. A method for forming an image on a recording sheet comprising:
- scanning a document;
- forming an image on a recording sheet from the scanned document;
- discharging the recording sheet;
- curving the recording sheet in a convex shape in a width direction;
- stacking the recording sheet; and
- controlling an interval of guide nieces so as to curve the recording sheet in a small curvature radius as the recording sheet goes from an upstream direction to a downstream direction.

7. The method according to claim 6, further comprising contacting the recording sheet discharged upward at an angle.

8. The method according to claim 6 further comprising attaching a guide member for curving the recording sheet.

9. A method for forming an image on a recording sheet comprising:
- scanning a document;
- forming an image on a recording sheet from the scanned document;
- discharging the recording sheet;
- curving the recording sheet in a convex shave in a width direction;
- stacking the recording sheet; and
- shortening a distance between a pair of guide pieces as the recording sheet goes from an upstream direction to a downstream direction.

10. A method for forming an image on a recording sheet comprising:
- scanning a document;
- forming an image on a recording sheet from the scanned document;
- discharging the recording sheet
- curving the recording sheet in a convex shape in a width direction; and
- stacking the recording sheet,
- wherein, a distance between a pair of guide pieces is lengthened as the recording sheet goes from the upstream direction to the downstream direction.

* * * * *